(12) United States Patent
Kaji et al.

(10) Patent No.: US 12,199,649 B2
(45) Date of Patent: Jan. 14, 2025

(54) SIGNAL GENERATING DEVICE AND FLOOR NOISE REDUCTION METHOD THEREFOR

(71) Applicant: ANRITSU CORPORATION, Kanagawa (JP)

(72) Inventors: Ittetsu Kaji, Kanagawa (JP); Takanori Tanaka, Kanagawa (JP); Kayoko Horiuchi, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 344 days.

(21) Appl. No.: 17/807,750

(22) Filed: Jun. 20, 2022

(65) Prior Publication Data

US 2023/0010569 A1 Jan. 12, 2023

(30) Foreign Application Priority Data

Jul. 7, 2021 (JP) ................................. 2021-112989

(51) Int. Cl.
*H04B 1/04* (2006.01)

(52) U.S. Cl.
CPC ... *H04B 1/0475* (2013.01); *H04B 2001/0491* (2013.01)

(58) Field of Classification Search
CPC .. H04B 1/0475; H04B 1/0035; H04B 1/0042; H04B 1/10; H04B 1/04; H04B 1/16; H04B 1/40
See application file for complete search history.

(56) References Cited

U.S. PATENT DOCUMENTS

| 7,957,476 B2* | 6/2011 | Sanada | H04L 27/2675 375/267 |
| 8,150,066 B2* | 4/2012 | Kubo | H04R 3/04 381/98 |
| 8,170,198 B2* | 5/2012 | Nakamiya | H04L 27/0006 379/283 |

FOREIGN PATENT DOCUMENTS

JP 2017-163482 A 9/2017

* cited by examiner

*Primary Examiner* — Tuan Pham
(74) *Attorney, Agent, or Firm* — Pearne & Gordon LLP

(57) ABSTRACT

The signal generating device includes a signal generator that generates a signal of a predetermined frequency, a high-pass filter bank that removes a signal of a frequency lower than or equal to a first frequency lower than a predetermined frequency from the signal generated by the signal generator, a YTF that removes a signal outside a predetermined frequency band from the signal output by the high-pass filter bank, a splitter that distributes the signal output by the YTF into a plurality of signals, two amplifiers that adjust levels of the signals distributed by the splitter, respectively, and two low-pass filter banks that remove signals of frequencies equal to or higher than a second frequency which is higher than the predetermined frequency from each of the signals output by the amplifiers.

6 Claims, 3 Drawing Sheets

SIGNAL GENERATING DEVICE AND FLOOR NOISE REDUCTION METHOD THEREFOR

TECHNICAL FIELD

The present invention relates to a signal generating device that generates continuous waves (CWs) and modulated waves in a desired frequency band.

BACKGROUND ART

As a signal generating device that generates continuous waves (CWs) and modulated waves in a desired frequency band, for example, a signal generating device is known that frequency-converts an intermediate frequency signal generated by any signal generator by a mixer or the like to generate CWs and modulated waves in a desired frequency band.

Such a signal generating device is incorporated in, for example, a mobile terminal test apparatus for testing a mobile communication terminal, and is adapted to generate and output a signal for testing.

Among the tests for mobile communication terminals, there are a conformance test and the like for confirming whether the mobile communication terminal complies with the 3rd Generation Partnership Project (3GPP) standard.

In the conformance tests, there is a test for testing the communication stability by superimposing an interference wave on the uplink and downlink signals for testing. A signal generating device is used to generate such an interference wave.

Patent Document 1 discloses a mobile terminal test device that has a plurality of antenna connection terminals for connecting an antenna, and performs an operation test of a mobile terminal performing wireless communication with a base station using a plurality of antennas connected to the plurality of antenna connection terminals in a state in which a signal transmission/reception cable is connected to the plurality of antenna connection terminals, in which a downlink signal required for testing the mobile terminal is generated and output and a fundamental wave component required for wireless communication is removed from a uplink signal output from the antenna connection terminal of the mobile terminal by filtering, only unnecessary wave components are extracted and added and synthesized to the downlink signal, and a signal that interferes with communication between the mobile terminal and the base station, such as harmonics and inter-modulated waves included in the uplink signal output by the mobile terminal, is added to the downlink signal.

RELATED ART DOCUMENT

[Patent Document]
[Patent Document 1] JP-A-2017-163482

DISCLOSURE OF THE INVENTION

Problem that the Invention is to Solve

The output of the interference wave generated by the signal generating device is not supposed to directly affect the uplink signal and the downlink signal, and as a consequence, when the interference wave signal output from the signal generator is superimposed on the uplink signal and the downlink signal as it is, the uplink signal and the downlink signal are interfered with by a floor noise derived from the signal generator, which may be troublesome.

Therefore, in the related art, in order to reduce floor noise, the output of the signal generator is passed through a band rejection filter (BRF) that removes signals in the frequency band of the uplink signal and the downlink signal, and an interference wave output to the mobile communication terminal.

However, in the test of the 5th generation mobile communication system (hereinafter, also referred to as "5G"), communication with a wide channel width such as a frequency bandwidth of 100 MHz is required, and in the BRF in the related art, signals in such a wide range frequency band cannot be removed.

Therefore, an object of the present invention is to provide a signal generating device capable of reducing floor noise in a wide frequency band.

Means for Solving the Problem

A signal generating device according to the present invention includes a signal generator that generates a signal of a predetermined frequency, a high-pass filter that removes a signal of a frequency lower than or equal to a first frequency which is lower than the predetermined frequency from the signal generated by the signal generator, a variable bandpass filter that removes a signal outside a predetermined frequency band from the signal output by the high-pass filter, and a low-pass filter that outputs a signal while removing a signal of a frequency equal to or higher than a second frequency which is higher than the predetermined frequency from the signal output by the variable bandpass filter.

With the configuration, from the signal generated by the signal generator, the signal of the frequency lower than or equal to the first frequency which is lower than the predetermined frequency is removed, the signal outside the predetermined frequency band is removed, and the signal of the frequency equal to or higher than the second frequency which is higher than the predetermined frequency is removed. Therefore, it is possible to reduce floor noise in a wide frequency band.

A signal generating device according to the present invention includes a signal generator that generates a signal of a predetermined frequency, a variable bandpass filter that removes a signal outside a predetermined frequency band from the signal generated by the signal generator, a high-pass filter that removes a signal of a frequency lower than or equal to a first frequency which is lower than the predetermined frequency from the signal output by the variable bandpass filter, and a low-pass filter that outputs a signal while removing a signal of a frequency equal to or higher than a second frequency which is higher than the predetermined frequency from the signal output by the high-pass filter.

With the configuration, from the signal generated by the signal generator, the signal outside the predetermined frequency band is removed, the signal of the frequency lower than or equal to the first frequency which is lower than the predetermined frequency is removed, and the signal of the frequency equal to or higher than the second frequency which is higher than the predetermined frequency is removed. Therefore, it is possible to reduce floor noise in a wide frequency band.

Further, the signal generating device according to the present invention may further include a splitter that distributes the signal output by the variable bandpass filter into a plurality of signals, and the signals distributed by the splitter may be filtered and output by a plurality of the low-pass filters, respectively.

Further, the signal generating device according to the present invention may further include a splitter that distributes the signal output by the high-pass filter into a plurality of signals, and the signals distributed by the splitter may be filtered and output by a plurality of the low-pass filters, respectively.

With the configuration, the signal filtered by the variable bandpass filter and the high-pass filter is distributed into a plurality of signals, and each of the distributed signals is filtered by the plurality of low-pass filters. Therefore, it is possible to reduce floor noise in a wide frequency band in the plurality of distributed signals.

Further, the signal generating device according to the present invention may further include a plurality of amplifiers that adjust levels of the signals distributed by the splitter, respectively.

With the configuration, the signal filtered by the variable bandpass filter and the high-pass filter is distributed into a plurality of signals, and each of the distributed signals is level-adjusted, and filtered by the plurality of low-pass filters. Therefore, it is possible to reduce floor noise in a wide frequency band while adjusting levels in the plurality of distributed signals.

Further, a floor noise reduction method for a signal generating device according to the present invention is a floor noise reduction method for a signal generating device including a signal generator that generates a signal of a predetermined frequency, the method including removing a signal of a frequency lower than or equal to a first frequency which is lower than the predetermined frequency from the signal generated by the signal generator, removing a signal outside a predetermined frequency band from a signal in which the signal of the frequency lower than or equal to the first frequency is removed, and outputting a signal while removing a signal of a frequency equal to or higher than a second frequency which is higher than the predetermined frequency from a signal in which the signal outside the predetermined frequency band is removed.

Further, the floor noise reduction method for a signal generating device according to the present invention may further include distributing the signal in which the signal outside the predetermined frequency band is removed into a plurality of signals, and each of the plurality of distributed signals may be output with the signal of the frequency equal to or higher than the second frequency being removed.

Further, the floor noise reduction method for a signal generating device according to the present invention may further include adjusting a level of each of the plurality of distributed signals.

With the configuration, from the signal generated by the signal generator, the signal of the frequency lower than or equal to the first frequency which is lower than the predetermined frequency is removed, the signal outside the predetermined frequency band is removed, and the signal of the frequency equal to or higher than the second frequency which is higher than the predetermined frequency is removed. Therefore, it is possible to reduce floor noise in a wide frequency band.

Advantage of the Invention

The present invention can provide a signal generating device capable of reducing floor noise in a wide frequency band.

BEST MODE FOR CARRYING OUT THE INVENTION

Hereinafter, a signal generating device according to an embodiment of the present invention will be described in detail with reference to the drawings.

Figure 1:
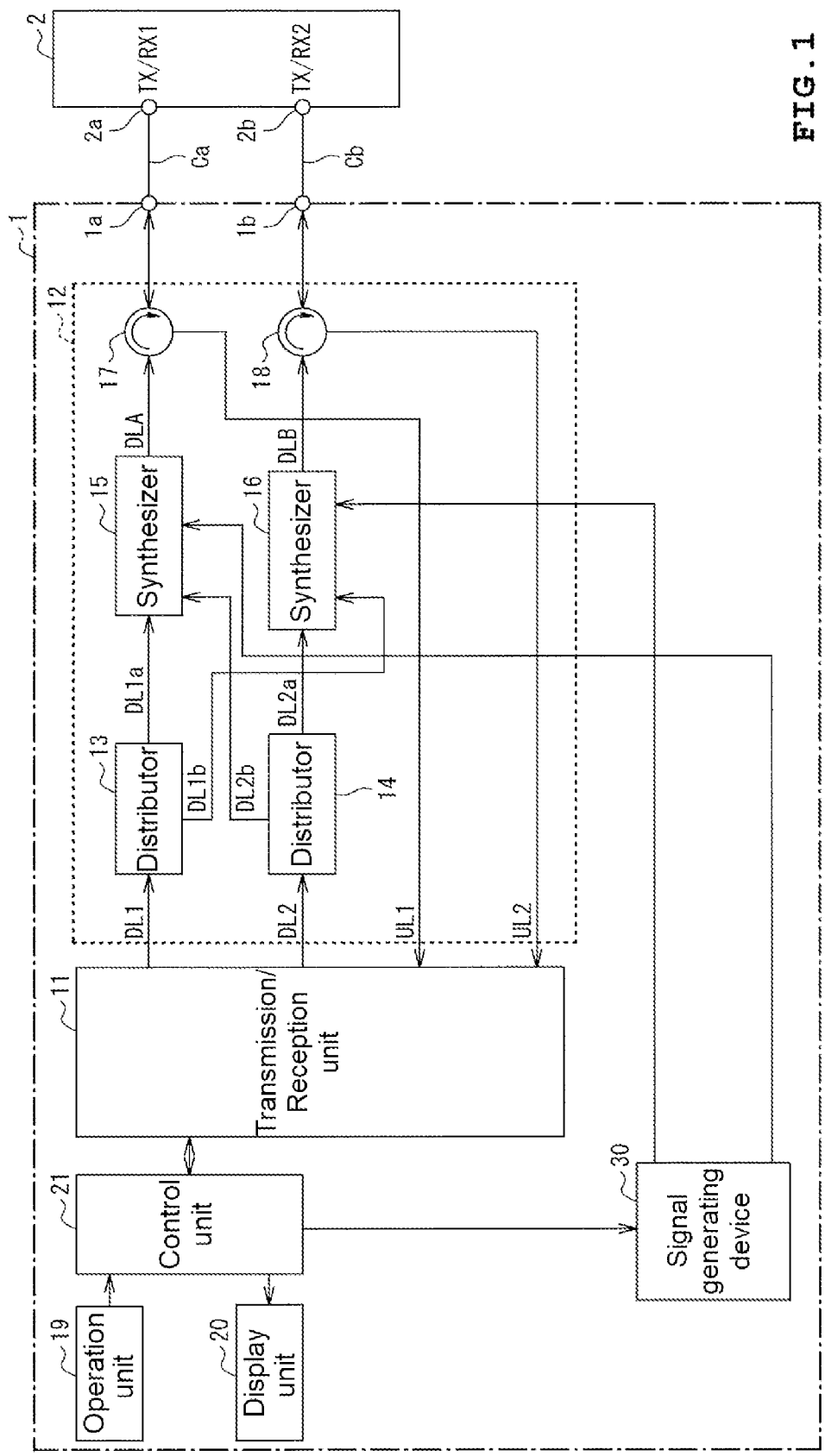
FIG. 1 is a block diagram of a mobile terminal test apparatus according to an embodiment of the present invention.

In FIG. 1, a mobile terminal test apparatus 1 equipped with a signal generating device according to an embodiment of the present invention includes a transmission/reception unit 11, an antenna signal generating unit 12, an operation unit 19, a display unit 20, and a control unit 21, and a signal generating device 30.

This mobile terminal test apparatus 1 sets, as a device under test, a mobile terminal 2 that supports a communication system such as carrier aggregation that transmits and receives signals to and from a base station using two different frequency bands B1 and B2, and as the simplest configuration example, the mobile terminal 2 is provided with an antenna connection terminal 2a for connecting an antenna for transmitting and receiving signals in the frequency band B1 and an antenna connection terminal 2b for connecting an antenna for transmitting and receiving signals in the frequency band B2.

Here, the mobile terminal 2 that uses two types of antennas for both transmission and reception for two frequency bands is set as the device under test; however, a system may be employed in which only one frequency band is used and a plurality of antennas including transmission/reception, reception only, transmission only, or the like, are used.

The transmission/reception unit 11 generates and outputs downlink signals DL1 and DL2 of two different frequency bands B1 and B2 required for testing the mobile terminal 2, and receives and demodulates uplink signals UL1 and UL2 output from the two antenna connection terminals 2a and 2b of the mobile terminal 2.

The antenna signal generating unit 12 supplies the downlink signals DL1 and DL2 output from the transmission/reception unit 11 to the two antenna connection terminals 2a of the mobile terminal 2, that is, the antenna connection terminal 2a and the antenna connection terminal 2b, and inputs the uplink signals UL1 and UL2 output from the two antenna connection terminals of the mobile terminal 2, that is, the antenna connection terminal 2b the two antenna connection terminals of the mobile terminal 2 to the transmission/reception unit 11.

Further, the antenna signal generating unit 12 adds the interference wave signal output from the signal generating device 30 to the downlink signals DL1 and DL2 output from the transmission/reception unit 11, and supplies the added signal to the two antenna connection terminals of the mobile terminal 2, that is, the antenna connection terminal 2a and the antenna connection terminal 2b.

The antenna signal generating unit 12 divides the downlink signals DL1 and DL2 into the number of antenna connection terminals (two in this case) of the mobile terminal 2 by a distributor 13 and a distributor 14, respectively, adds, by a synthesizer 15 and a synthesizer 16, sets of downlink signals (DL1a, DL2b) and (DL1b, DL2a) obtained by being selected and combined one by one from the divided downlink signals (DL1a, DL1b) and (DL2a, DL2b), and generates signals to be received by the two respective antenna connection terminals 2a and 2b of the mobile terminal 2.

In addition to the downlink signal synthesis function, the synthesizer 15 and the synthesizer 16 also have a synthesis function of adding the interference wave signal output from the signal generating device 30 to the downlink signal.

The synthesized signals DLA and DLB output from the synthesizer 15 and the synthesizer 16 are input to the antenna connection terminal 2a and the antenna connection terminal 2b of the mobile terminal 2, respectively, via a circulator 17, a circulator 18, the signal terminal 1a, the signal terminal 1b, and a cable Ca and a cable Cb.

Meanwhile, the uplink signals UL1 and UL2 output from the antenna connection terminal 2a and the antenna connection terminal 2b of the mobile terminal 2 are input to the transmission/reception unit 11 via the cable Ca, the cable Cb, the signal terminal 1a, the signal terminal 1b, the circulator 17, and the circulator 18.

The operation unit 19 includes input devices such as a keyboard, a mouse, and a touch panel, and outputs various parameters, test items, or the like, input by the operation to the control unit 21. The display unit 20 includes an image display device such as a liquid crystal display, and displays an image for inputting various parameters, test items, or the like, an image showing a state during a test, an image showing a test result, and the like.

The output of the downlink signals and the reception/demodulation of the uplink signals by the transmission/reception unit 11 are controlled by the control unit 21. The control unit 21 controls the transmission/reception unit 11 according to various parameters and test items specified in advance by the operation of the operation unit 19, performs a link establishment process (call connection process) with the mobile terminal 2, which is the device under test, executes various tests, and displays the test results and the like on the display unit 20.

Further, the control unit 21 controls the signal generating device 30 to generate an interference wave signal specified by the operation of the operation unit 19, and performs synthesis by adding the interference wave signal to the downlink signals DL1 and DL2 output from the transmission/reception unit 11 and outputs the synthesized signal to the mobile terminal 2.

Figure 2:
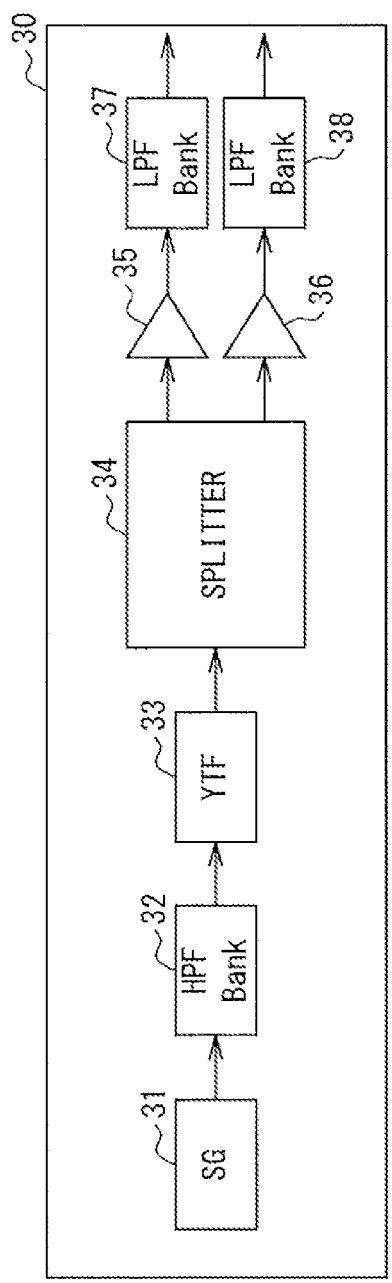
FIG. 2 is a block diagram of a signal generating device of the mobile terminal test apparatus according to the embodiment of the present invention.

As shown in FIG. 2, the signal generating device 30 is configured to include a signal generator 31, a high-pass filter bank 32 as a high-pass filter, an yttrium iron garnet tuned filter (YTF) 33 as a variable bandpass filter, a splitter 34, an amplifier 35, an amplifier 36, a low-pass filter bank 37 as a low-pass filter, and a low-pass filter bank 38 as a low-pass filter.

The signal generator 31 generates an intermediate frequency signal, frequency-converts the generated signal to generate a CW and a modulated wave in a desired frequency band, and outputs the generated waves as an interference wave.

The high-pass filter bank 32 removes subharmonics by removing a signal lower than or equal to a first frequency, which is a frequency lower than the frequency band of the interference wave signal generated by the signal generator 31. The high-pass filter bank 32, for example, switches a plurality of high-pass filters with a switch to remove a signal lower than or equal to a desired frequency.

When the frequency band of the interference wave signal generated by the signal generator 31 is changed, the high-pass filter bank 32 switches, for example, the plurality of high-pass filters with the switch according to the change, and removes a signal lower than or equal to a desired frequency.

The YTF 33 removes floor noise in a frequency band other than the interference wave by removing a signal outside the frequency band of the interference wave of the signal output by the high-pass filter bank 32. The YTF 33 can change the frequency band of the signal to be passed without being removed.

When the frequency band of the interference wave signal generated by the signal generator 31 is changed, the frequency band of the signal to be passed without being removed by YTF 33 is changed according to the change.

The splitter 34 distributes the signal output by the YTF 33 to the number of antenna connection terminals (2 in this case).

The amplifier 35 and the amplifier 36 adjust levels of the signals distributed by the splitter 34, respectively.

The low-pass filter bank 37 and the low-pass filter bank 38 remove harmonics by removing a signal equal to or higher than a second frequency, which is a frequency higher than the frequency band of the interference wave of the signals output by the amplifier 35 and the amplifier 36. The low-pass filter bank 37 and the low-pass filter bank 38, for example, switch a plurality of low-pass filters with a switch to remove a signal equal to or higher than a desired frequency.

When the frequency band of the interference wave signal generated by the signal generator 31 is changed, the low-pass filter bank 37 and the low-pass filter bank 38 switch, for example, the plurality of low-pass filters with the switch according to the change, and removes a signal equal to or higher than a desired frequency.

Figure 3:
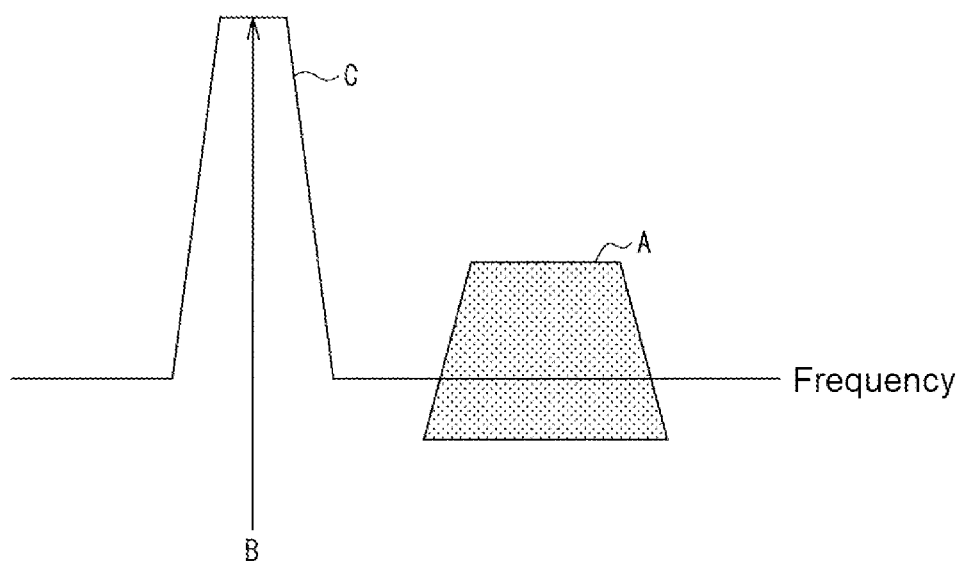
FIG. 3 is a diagram showing an example of a frequency spectrum for describing an applying method for a filter by a processing method of the mobile terminal test apparatus according to the embodiment of the present invention.

As shown in FIG. 3, the signal generating device 30 according to the present embodiment configured as described above passes only the frequency band of the interference wave shown by B in the figure, and outputs a signal of a spectrum as shown by C in the figure, in which signals in the other frequency bands are removed, as an interference wave signal, and thus it is possible to remove floor noise in the frequency band of the downlink signal, which is the test signal shown by A in the figure.

As described above, in the above-described embodiment, only the frequency band of the interference wave of the signal generated by the signal generator 31 is passed and the signals in the other frequency bands are removed, and thus it is possible to reduce floor noise in a wide frequency band as compared with the method of removing floor noise in the frequency band of the downlink signal of the device under test.

Further, the signal output by the YTF 33 is distributed to the number of antenna connection terminals, and thus it is possible to suppress the number of expensive YTFs 33 used, which makes it possible to reduce the cost.

Further, there is no fixed filter, and thus it is possible to output a general-purpose interference wave when there is no significant change in the frequency band of the interference wave, which makes it possible to reduce the cost, improve the versatility, and shorten the measurement time.

In addition, even if the frequency band of the downlink signal of the device under test is added, there is no need to change the hardware, there is no need to add or adjust hardware, and thus it is possible to easily cope with the addition of the frequency band of the downlink signal of the device under test.

Further, since floor noise is removed by the YTF 33, the harmonics are removed by the low-pass filter bank 37, and the subharmonics are removed by the high-pass filter bank 32, the filter does not need to be steeper than the method of removing floor noise and harmonics at one with a steep BRF, and thus it is possible to lower the required performance of the filter itself, which makes it possible to improve the yield and reduce the cost.

In the present embodiment, the signal filtered by the high-pass filter bank 32 is filtered by the YTF 33; however, the signal filtered by the YTF 33 may be filtered by the high-pass filter bank 32. Further, the high-pass filter bank 32, the YTF 33, and the low-pass filter bank 37 may be each configured to be used in a connected (through) state without going-through.

Further, when the signal generating device 30 is provided with a detector to adjust the YTF 33, it is possible to shorten the time required for the adjustment of the YTF 33.

Although the embodiment of the invention has been disclosed, it will be apparent to those skilled in the art that modifications may be made without departing from the scope of the invention. All such modifications and equivalents are intended to be included in the following claims.

DESCRIPTION OF REFERENCE NUMERALS AND SIGNS

1 Mobile terminal test apparatus
30 Signal generating device
31 Signal generator
32 High-pass filter bank (high-pass filter)
33 YTF (variable bandpass filter)
34 Splitter
35, 36 Amplifier
37, 38 Low-pass filter bank (low-pass filter)

What is claimed is:

1. A signal generating device comprising:
   a signal generator that generates a signal of a predetermined frequency;
   a high-pass filter that removes a signal of a frequency lower than or equal to a first frequency which is lower than the predetermined frequency from the signal generated by the signal generator;
   a variable bandpass filter that removes a signal outside a predetermined frequency band from the signal output by the high-pass filter; and
   a low-pass filter that outputs a signal while removing a signal of a frequency equal to or higher than a second frequency which is higher than the predetermined frequency from the signal output by the variable bandpass filter.

2. The signal generating device according to claim 1, further comprising a splitter that distributes the signal output by the variable bandpass filter into a plurality of signals, wherein
   the signals distributed by the splitter are filtered and output by a plurality of the low-pass filters, respectively.

3. The signal generating device according to claim 2, further comprising a plurality of amplifiers that adjust levels of the signals distributed by the splitter, respectively.

4. A floor noise reduction method for a signal generating device including a signal generator that generates a signal of a predetermined frequency, the method comprising:
   removing a signal of a frequency lower than or equal to a first frequency which is lower than the predetermined frequency from the signal generated by the signal generator;
   removing a signal outside a predetermined frequency band from a signal in which the signal of the frequency lower than or equal to the first frequency is removed; and
   outputting a signal while removing a signal of a frequency equal to or higher than a second frequency which is higher than the predetermined frequency from a signal in which the signal outside the predetermined frequency band is removed.

5. The floor noise reduction method according to claim 4, further comprising distributing the signal in which the signal outside the predetermined frequency band is removed into a plurality of signals, wherein
   each of the plurality of distributed signals is output with the signal of the frequency equal to or higher than the second frequency being removed.

6. The floor noise reduction method according to claim 5, further comprising adjusting a level of each of the plurality of distributed signals.

* * * * *